US012567885B2

(12) United States Patent
Bye et al.

(10) Patent No.: US 12,567,885 B2
(45) Date of Patent: Mar. 3, 2026

(54) ACCESSORY DEVICE FOR SATELLITE COMMUNICATIONS

(71) Applicant: Boost SubscriberCo L.L.C., Englewood, CO (US)

(72) Inventors: Stephen James Bye, Littleton, CO (US); In-Kyung Kim, Highlands Ranch, CO (US)

(73) Assignee: Boost SubscriberCo L.L.C., Englewood, CO (US)

( * ) Notice: Subject to any disclaimer, the term of this patent is extended or adjusted under 35 U.S.C. 154(b) by 310 days.

(21) Appl. No.: 18/098,908

(22) Filed: Jan. 19, 2023

(65) Prior Publication Data

US 2024/0120973 A1     Apr. 11, 2024

Related U.S. Application Data

(60) Provisional application No. 63/378,485, filed on Oct. 5, 2022.

(51) Int. Cl.
| | |
|---|---|
| *H04B 7/04* | (2017.01) |
| *H01Q 1/27* | (2006.01) |
| *H01Q 21/28* | (2006.01) |
| *H04B 7/0426* | (2017.01) |
| *H01Q 1/22* | (2006.01) |

(52) U.S. Cl.
CPC ............. *H04B 7/043* (2013.01); *H01Q 1/273* (2013.01); *H01Q 21/28* (2013.01); *H01Q 1/2291* (2013.01)

(58) Field of Classification Search
CPC ........ H04B 7/043; H01Q 1/273; H01Q 21/28; H01Q 1/2291
See application file for complete search history.

(56) References Cited

U.S. PATENT DOCUMENTS

| | | | | |
|---|---|---|---|---|
| 5,081,703 | A * | 1/1992 | Lee .................... | H04B 7/18558 |
| | | | | 455/13.1 |
| 7,053,822 | B2 | 5/2006 | Rickerson, Jr. | |
| 9,532,398 | B2 * | 12/2016 | Mar ...................... | H04W 52/36 |
| 10,250,948 | B1 * | 4/2019 | Bortz ................. | H04N 21/4788 |
| 10,838,073 | B2 | 11/2020 | Park et al. | |
| 10,922,050 | B2 | 2/2021 | Krispin | |
| 11,137,490 | B2 | 10/2021 | Hirvonen et al. | |
| 2002/0022452 | A1 * | 2/2002 | Toya .................... | H04B 7/1853 |
| | | | | 455/13.1 |

(Continued)

*Primary Examiner* — Junpeng Chen
(74) *Attorney, Agent, or Firm* — Fish & Richardson P.C.

(57) ABSTRACT

Disclosed herein is a portable electronic accessory. The accessory has a body and a housing covering configured to attach to a portion of a human body or another external apparatus. The housing includes a satellite modem for (i) converting digital data received from a mobile device into first radio signals for transmission to a satellite, and (ii) converting second radio signals received from the satellite into digital data for the mobile device. The first and second radio signals are within a corresponding frequency band of the satellite. A wireless communication module supports two-way communications with the mobile device. A power source powers the satellite modem and the wireless communication module. Multiple antenna elements are coupled to the satellite modem that (i) radiate the first radio signals and (ii) receive the second radio signals. The multiple antenna elements each have a radiating surface facing an external face of the housing.

20 Claims, 4 Drawing Sheets

(56) References Cited

U.S. PATENT DOCUMENTS

| | | | |
|---|---|---|---|
| 2015/0282061 A1* | 10/2015 | Matthews | H04W 4/027 |
| | | | 455/404.1 |
| 2015/0301191 A1* | 10/2015 | Wallace | G01S 19/32 |
| | | | 342/357.42 |
| 2016/0063232 A1* | 3/2016 | Seol | G06F 21/32 |
| | | | 726/19 |
| 2017/0172424 A1 | 6/2017 | Eggers et al. | |
| 2018/0013195 A1* | 1/2018 | Hviid | H01Q 1/38 |
| 2018/0139518 A1 | 5/2018 | Touma et al. | |
| 2018/0248634 A1* | 8/2018 | Pascolini | H04B 17/318 |
| 2020/0006972 A1* | 1/2020 | Butler | H04M 1/18 |
| 2021/0014598 A1* | 1/2021 | Pine | H04R 1/1041 |
| 2023/0318650 A1* | 10/2023 | Abedin | H01Q 21/061 |
| | | | 455/575.1 |

* cited by examiner

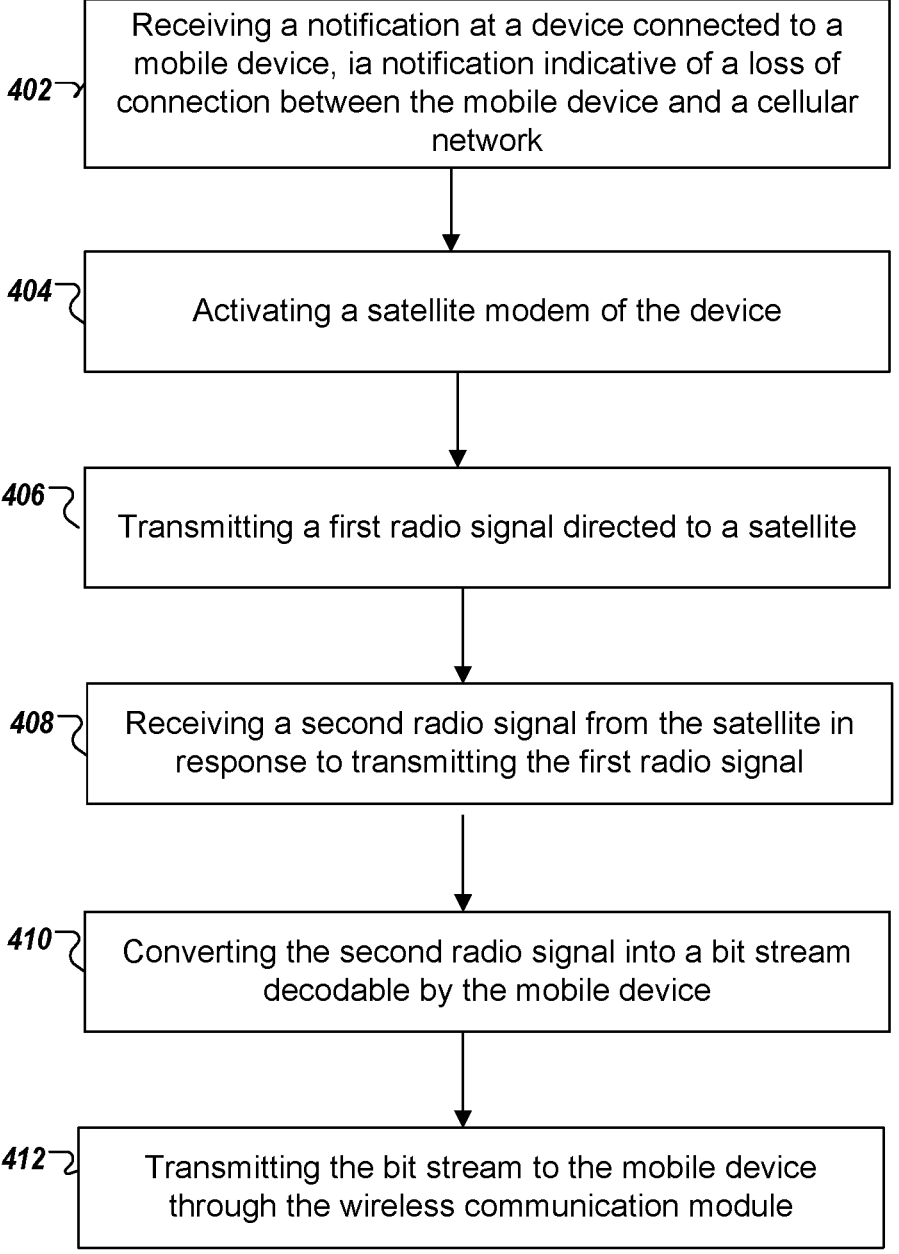

402 — Receiving a notification at a device connected to a mobile device, ia notification indicative of a loss of connection between the mobile device and a cellular network 404 — Activating a satellite modem of the device 406 — Transmitting a first radio signal directed to a satellite 408 — Receiving a second radio signal from the satellite in response to transmitting the first radio signal 410 — Converting the second radio signal into a bit stream decodable by the mobile device 412 — Transmitting the bit stream to the mobile device through the wireless communication module

ACCESSORY DEVICE FOR SATELLITE COMMUNICATIONS

CROSS-REFERENCE TO RELATED APPLICATION

This application claims the benefit of priority to U.S. Application No. 63/378,485, filed on Oct. 5, 2022, the contents of which are hereby incorporated by reference.

TECHNICAL FIELD

Disclosed herein is a portable electronic accessory to a mobile device, the electronic device configured for satellite communications.

BACKGROUND

Terrestrial mobile communications providing local geographic coverage include GSM and its variants, CDMA, IS-136, and a variety of others using time division multiple access (TDMA) and code division multiple access (CDMA) techniques. Mobile communication networks utilize a tower cell that has a relatively short range. Widening the cellular networks require a large number of towers to cover cities, which may be very expensive or require infrastructure that is not readily available. Such systems, even though they are efficient and cost-effective in providing high capacity and coverage indoors and in dense urban areas, are not efficient and cost effective in thinly populated areas. As such, it is not cost effective for the cellular providers to provide cell towers in rural areas or other thinly populated locations. Satellite signals do not rely on towers, and are thus especially useful in remote and thinly populated areas. Satellite communications can therefore be more reliable than cellular communications for individuals traveling to isolated and remote areas.

SUMMARY

This specification describes technologies pertaining to portable (potentially wearable) accessory to a mobile device. The accessory is configured to communicate with a mobile device over a wireless connection such as a Bluetooth® or Wi-Fi connection, and also with a satellite, particularly when cellular communication networks are unavailable or of low quality. The antenna or the antenna array disposed on the accessory can provide direction-optimized, satellite single frequency band-optimized, line-of-sight communication with a satellite. By providing one or more dedicated antennas, or an array of antennas, on an accessory that is remote with respect to the mobile device, disadvantages associated with using antennas disposed within the form factor of a mobile device are alleviated. For example, in comparison to antennas disposed within a mobile phone, the antennas on the remote accessory can be better optimized for directional communication with a satellite over the dedicated frequency band of the satellite. In addition, losses associated with a mobile device being held or carried by a user (head-losses, hand-losses, etc.) can be significantly reduced by the use of a separate, connected accessory that can be worn by a user or attached to a backpack, etc. The improved gain (as compared to using antennas within a mobile device) in communicating with a satellite can result in higher available data throughput, which in turn can allow for bandwidth-intensive communications such as voice calls, video calls, multi-media messaging etc.

In contrast to satellite communication systems disposed within the form factor of a mobile device, the systems described herein do not require substantial user-cooperation or user-action (e.g., triggering a particular application, holding in a particular way to allow for line-of-sight communications with a satellite etc.) to establish a communication link with a satellite. Such user-cooperation or user-action may be needed for systems disposed within the form factor of a mobile device because the communications link budget for such systems is typically very low. Therefore, to ensure service availability, the user typically has to hold the mobile device in particular orientations (pointing upwards, away from the body, etc.) to ensure line-of-sight communications with the satellite. In contrast, the antenna(s) and the form-factor of the devices disclosed herein, can potentially provide better service availability without substantial user-cooperation or user-action at least because the location of the antenna(s) or antenna array on the device is configured to enable line-of-sight communications with satellite and the accessory device is already attached or worn at a location that enhances the chances of a satellite communication link being established (as compared to a mobile device that is typically carried within clothing, a bag, or a case).

In one aspect, this document describes an electronic device. The electronic device has a body and a housing covering the body that is configured to attach to a portion of a human body or another external apparatus that the housing is configured to support. A satellite modem is configured to (i) convert digital data received from a mobile device into first radio signals for transmission to a satellite. The modem is additionally configured to (ii) convert second radio signals received from the satellite into digital data for the mobile device. The first radio signals and the second radio signals are within a corresponding frequency band associated with the satellite. A wireless communication module is configured to support two-way communications with the mobile device. A power source is configured to provide operating power to the satellite modem and the wireless communication module. Multiple antenna elements are coupled to the satellite modem. The multiple antenna elements configured to (i) radiate the first radio signals and (ii) receive the second radio signals from the satellite. The multiple antenna elements is disposed in the housing such that a radiating surface of each of the antenna elements is disposed on an external face of the housing.

In some implementations, the electronic device includes a communication circuit configured to wirelessly couple to the mobile device.

In some implementations of the electronic device, the body is configured to be worn on the body of a user of the electronic device.

In some implementations, the multiple antennas can be portion of a smart antenna array that allows for directed beamforming towards the satellite.

In some implementations of the electronic device, the corresponding frequency band excludes frequencies used in terrestrial cellular networks.

In some implementations, the wireless communication module is a Bluetooth® or Wi-Fi module.

In some implementations, the antenna elements include a first set of antennas dedicated to a first frequency band and a second set of antennas dedicated to a second frequency band.

In some implementations of the electronic device, one of the first frequency band or second frequency band has a same frequency as the corresponding frequency band associated with the satellite.

In some implementations, the corresponding frequency band is between about 1 GHz and about 50 GHz.

In some implementations, the body is configured to wear around the neck of a user of the electronic device.

In some implementations, the body is configured to be attached an accessory worn by a user of the electronic device.

In another aspect, this document describes a method for operating an electronic accessory device connected to a mobile device. The method includes receiving, at a wireless communication module of the accessory device over a wireless connection, a notification indicative of a loss of connection between the mobile device and a cellular network. In response to receiving the notification, the method includes activating a satellite modem of the device. Additionally, the method includes accessing multiple antenna elements coupled to the modem. The antenna elements are disposed in the device such that a radiating surface of each of the antenna elements is disposed on an external face of the device. The method includes transmitting, by the satellite modem via the multiple antenna elements, a first radio signal directed to a satellite. Additionally, the method includes receiving, at the satellite modem via the multiple antenna elements, a second radio signal from the satellite in response to transmitting the first radio signal.

The satellite modem converts the second radio signal into a bit stream decodable by the mobile device. The method proceeds by transmitting the bit stream to the mobile device through the wireless communication module.

Various implementations of the above aspects can include one or more of the following features.

The method can include activating the multiple antenna elements coupled to the modem. Upon activating the satellite modem of the device, a scan for satellites within a range of the satellite modem may be initiated. A beamforming process can be executed to focus a directivity of the multiple antenna elements towards the satellite. The multiple antenna elements can include a first set of antenna elements dedicated to a first frequency band and a second set of antenna elements dedicated to a second frequency band different from the first frequency band, and one of the first set of antenna elements or the second set of antenna elements can be selected in accordance with a satellite detected within a range of the satellite modem.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIG. 1 illustrates a communications environment having a satellite, a transceiver, and a plurality of user devices.

FIG. 4 is a flow chart of an exemplary method of operating the portable electronic accessory shown in FIGS. 2-4.

Like reference numbers and designations in the various drawings indicate like elements.

DETAILED DESCRIPTION

Figure 2:
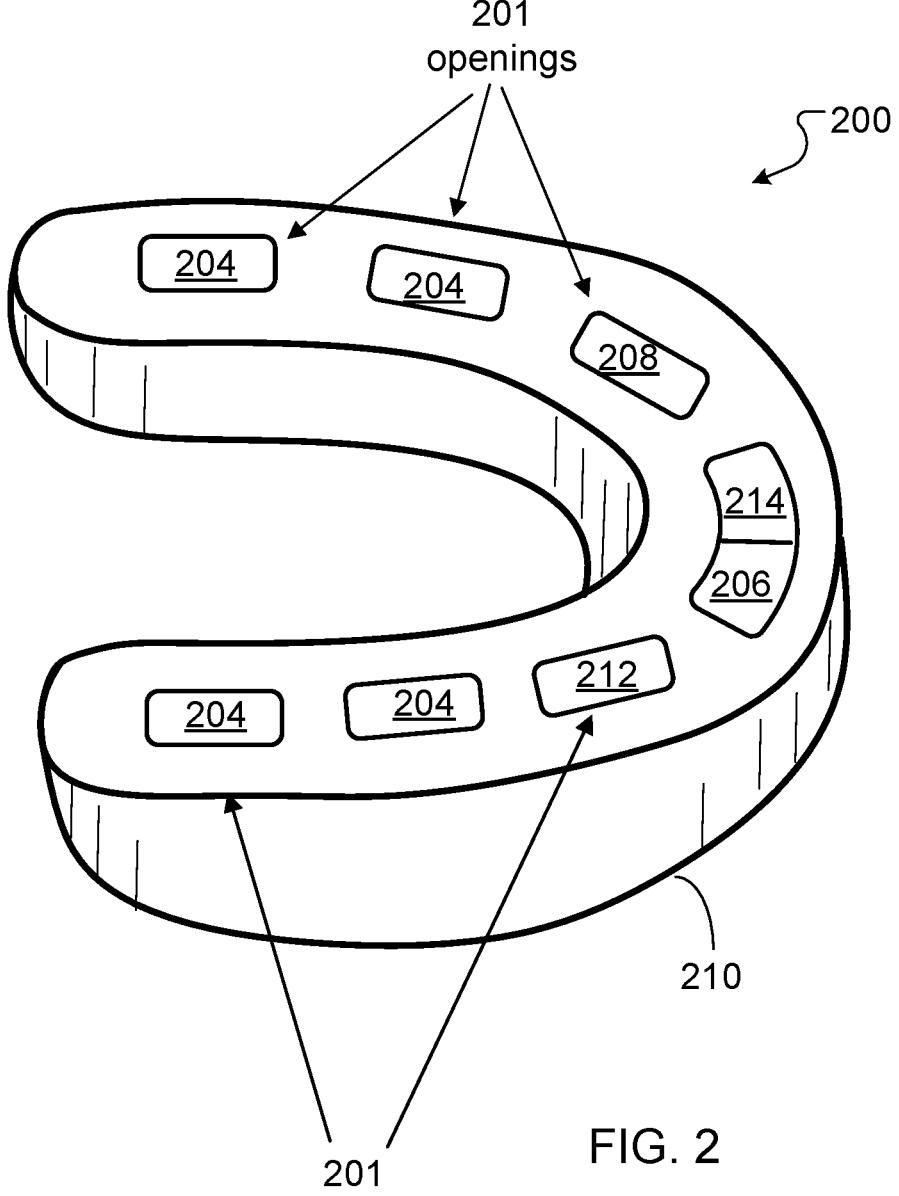
FIG. 2 illustrates a portable electronic accessory for one of the plurality of user devices shown in FIG. 1 that is configured to communicate with the satellite.

Disclosed herein is a wearable accessory for a mobile device, configured for satellite communications. Mobile phones (i.e., cell phones) rely on a network of cell towers, such as base stations, to establish a cellular network through which mobile phones communicate with other phones on the network, as well as additional terrestrial communications networks. Antennas used in mobile phones are often isotropic antennas each of which radiates equally in all directions with the same intensity. The antennas are multi-frequency band and multi-purpose, and configured for connecting with cellular towers and base stations. Because mobile phones often change positions relative to base stations, the isotropic model can be preferable.

However, in some cases, the isotropic model may not be the most ideal for satellite-communication antennas where the relative position between the corresponding portable electronic accessory and a communications satellite remains largely unchanged at a given location. In remote locations, particularly where no base stations are available, there can be little to no mobile phone coverage. Direct calls, particularly emergency calls or messaging, utilizing mobile phones in remote areas can, in some cases, be impractical or even impossible. One solution is to use antennas of a mobile phone to communicate with satellites, particularly when the mobile phone is not able to connect to a cellular network. However, the antennas disposed within a mobile device are multi-purpose—and typically not specifically optimized for communication over particular satellite frequency bands. Further, additional signal loss can be incurred by proximity of the mobile phone and thus the antenna(e) to a head of the user, or signal loss incurred by the mobile phone being held in the hand of the user. Additionally, the antennas being confined within the form factor (i.e., e size, shape, and other physical specification) of the mobile-phone can cause signal loss and/or other forms of performance degradation when communicating with a satellite.

The disclosed portable electronic accessory for a mobile device utilizes one or more dedicated anisotropic antennas that are optimized for communication with one or more satellites. Each set of antenna elements is single frequency and optimized to frequency of satellite. The antennas (i.e., antenna elements) are disposed within a body of the portable electronic accessory for a mobile device. In addition, in some implementations, the portable electronic accessory for a mobile device is not held in the hand of the user nor is the device as close to the head of the user as a mobile phone, thus reducing signal loss that might otherwise occur. The positions of the multiple antennas in the electronic device can be configured to facilitate a line-of sight communication to the satellite. Accordingly, better bandwidth may be achieved, which in turn can facilitate improved voice, video, and text receipt and transmission as compared to what may be possible using a mobile device alone. For example, the device disclosed herein can achieve between about 5-10 dB signal improvement compared to conventional mobile phones.

Figure 1:
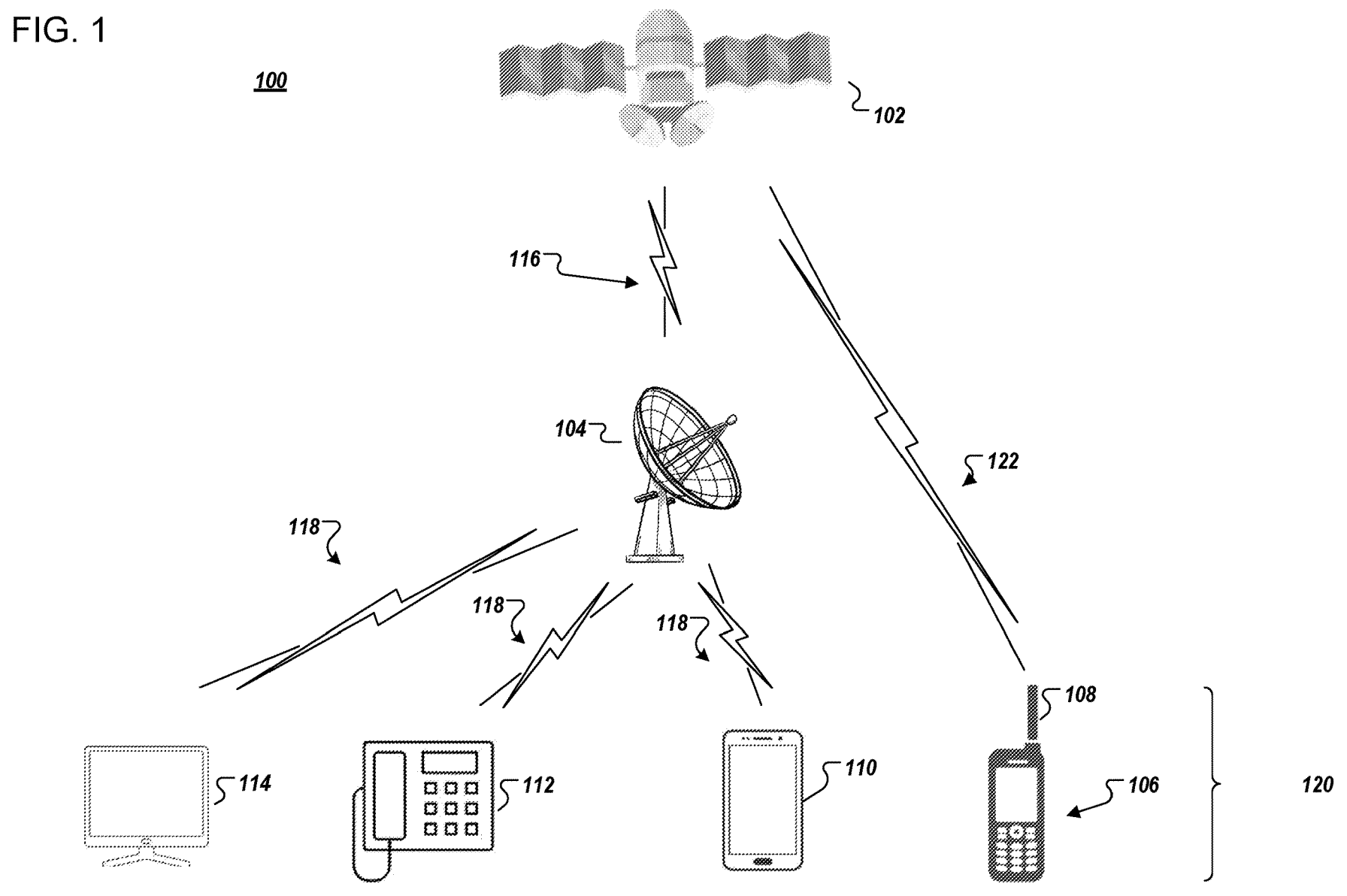

FIG. 1 illustrates a communications environment 100 having a satellite 102, a transceiver 104, and a plurality of user devices 120. The communications environment 100 includes a plurality of wired and/or wireless devices, which include for example, a satellite phone 106, a mobile device 110, a landline phone 112, and a computer 114. It should be appreciated that examples exist with more or fewer user devices; e.g., typically, thousands or millions of user devices are utilized, being spread across a wide geographic region. By way of example in the present disclosure, user devices 120 receive audio and/or visual content programs via satellite 102, and one or more wired and/or wireless networks (not shown). As described more below, each respective user devices 120 may execute a process to control the manner in which program content is delivered, respectively, to them.

The satellite phone 106 has one or more antenna 108 that can directly send transmit and receive direct signals 122 to and from the satellite 102. On the other hand, the transceiver 104 acts as an intermediary device between the satellite 102 and the other devices. It is further appreciated that additional hardware and infrastructure (not shown) enables communication between the user devices 120 and the satellite 102. For example, the communications environment 100 can include wireless communication system (e.g., wireless network cellular network), telephone networks, telephone lines, fiber optic cables, microwave transmission links, data centers, and the like.

The satellite 102 can include at least one server which delivers program content to the user devices 120. For each program content, the server iteratively executes a predictive algorithm to determine one or more transmission-quality-of-service (TXQ) parameters. The server uses these TXQ parameters to transmit the respective content program to a respective one of the user devices 120.

One or more first signals 116 are transmitted and received between the satellite 102 and the transceiver 104. The transceiver 104 can convert the first signals 116 into format compatible for terrestrial communication devices (e.g., mobile device 110, landline 112, and the computer 114). After converting the first signals 116, one or more second signals 118 are transmitted or received from the terrestrial communication devices and the transceiver 104.

It is further understood that only one satellite 102 is illustrated, and that the user devices 120 can communicate with one or more satellites 102, such as a constellation of satellites. A transceiver 104 stores and manages delivery of program contents to the plurality of user devices 120. The transceiver 104 can include a server. In at least one example, the transceiver 104 is coupled to a gateway (not shown). In another example, the transceiver 104 includes the gateway. The satellite 102 can be any suitable satellite communication equipment that is located in earth's orbit. Several non-limiting examples include communications satellites, observation satellites, navigation satellites, weather satellites, space telescopes, etc. Non-limiting examples of earth orbits include: geocentric orbits, heliocentric orbits, areocentric orbits, low earth orbits (LEO), medium earth orbits (MEO), geosynchronous orbits (GEO), high earth orbits (HEO), and the like.

Referring to the mobile device 110 in FIG. 1, the underlying wireless communication system can include Long Term Evolution (LTE) and Fifth Generation (5G) New Radio (NR) communication standards as defined by the Third Generation Partnership Project (3GPP) technical specifications. In some implementations, the wireless communication system can include a Non-Standalone (NSA) networks that incorporate both LTE and NR, for example, E-UTRA (Evolved Universal Terrestrial Radio Access)-NR Dual Connectivity (EN-DC) networks, and NE-DC networks. However, the communications environment 100 may also be a Standalone (SA) network that incorporates only NR. Furthermore, other types of communication standards are possible, including future 3GPP systems (e.g., Sixth Generation (6G)) systems, IEEE 802.16 protocols (e.g., WMAN, WiMAX, etc.), or the like.

The ability of the mobile device to send and receive any messages depends on the availability of a base station (commonly referred to as a cellular tower or cell tower) in the vicinity of the mobile device 110. In other words, the mobile device needs to be within a "cell" of a cellular network in order to be able to send and receive messages. However, in many remote areas, base stations may be sparse, causing a mobile device to lose connectivity to the cellular network. This is particularly true for thinly populated and/or wilderness areas where installing base stations may not be economically feasible for service providers. Yet, people often travel to such areas, and can experience the need to be able to communicate with their mobile devices. For example, backpackers or hikers may get lost, or experience a medical emergency in uninhabited/remote areas and need to establish contact with authorities to seek help. To address such situations, mobile devices can include satellite communication capabilities such that the devices are able to communicate directly with a satellite when outside the area of cellular coverage. However, the antennas of mobile devices are located within the small form factor of the devices, which in many cases make them sub-optimal for satellite communications. For example, the antennas may not be specifically configured for optimized communications with satellites, thereby resulting in losses and low bandwidth. In addition, holding a mobile device in the hands of a user, or next to the head, can contribute to additional losses, making the satellite communication abilities of the mobile device to be sub-optimal and potentially unusable in some cases. In some cases, the available bandwidth may only be good enough to send short messages or beacon signals, thereby hampering effective communications (over voice call, video etc.) that can be potentially life-saving in some emergency situations.

FIG. 2 illustrates a portable electronic accessory 200 for the mobile device 110, the portable electronic accessory 200 configured to communicate with a satellite in conjunction with the mobile device 110. In some implementations, the portable electronic accessory 200 includes a body 202 with a plurality of openings 201 or slots. One or more antenna elements 204 are disposed in one or more of the openings 201 in the body 202 such that a radiating surface of each antenna is disposed on or proximate an external face of the housing 210, e.g., a surface that faces skyward—thereby allowing for line-of-sight communications with a satellite. A satellite modem 208 is electrically coupled to each one of the one or more antenna elements 204. A power source 206 (e.g., a battery, or battery pack) provides power to the satellite modem 208. In some examples, the body 202 is encased within a housing 210, which can include, for example, a fabric covering at least a portion of the body 202. In other examples, the housing 210 can be a casing made from cotton, plastic, metal, polymer, polyurethane, or similar synthetic materials. In some implementations, the body 202 and/or the housing 210 can be made of flexible material that allows the portable electronic accessory to be worn on the body and/or attached to another accessory such as a backpack.

In some implementations, the portable electronic accessory 200 also includes a wireless communication module 214 that is configured to support two-way communications with the mobile device 110. The wireless communication module 214 may include circuitry configured to transmit and receive short-range wireless signals such as, for example, Bluetooth, NFC, UFB, Z-wave, and Zigbee. In some implementations, the wireless communication module 214 can be configured to communicate over Wi-Fi protocols. The short-range wireless signals is transmitted from the mobile device 110 and received at the portable electronic accessory 200. The portable electronic accessory 200, upon activation, transmits and receives direct signals to and from a satellite. In this manner, the mobile device 110 can establish a communications link to the satellite 102 via the portable electronic accessory 200. In some implementations, the mobile device 110 has an application installed that enables short-range wireless signals to be sent to and received from the portable electronic accessory 200.

In some implementations, due to the presence of antenna elements optimized for satellite communications on the accessory 200, the mobile device 110 can establish a high-throughput communications link with a satellite through the accessory 200. In some implementations, the high-through-put link can be configured to support bandwidth-intensive communications such as voice, video, image, and text packets when the mobile device 110 is outside cellular coverage area. In comparison to cases where the satellite communication antennas are embedded within the forma cator of the mobile device, the portable electronic accessory 200 can potentially improve the communication link with the satellite by minimizing signal losses resulting from holding the mobile device 110 in the hand or adjacent to the head of a user. For example, in some cases, the portable electronic accessory 200 can achieve between about 5-10 dB improvement as compared to cases where the satellite communication antennas are disposed within the mobile device.

In some implementations, the power source 206 can be configured to provide operating power to both the satellite modem 208 and the wireless communication module 214. The satellite modem 208 is configured to convert digital data received from the mobile device 110 into one or more first radio signals for transmission to the satellite 102. Additionally, the satellite modem 208 converts one or more second radio signals received from the satellite 102 into digital data for the mobile device 110. The first radio signals and the second radio signals are within a corresponding frequency band associated with the satellite.

In some implementations, the portable electronic accessory 200 is activated on demand when the mobile device 110 loses communication with the cellular network, or the communication falls below a predetermined threshold quality. As such, the wireless communication module 214 can be configured to transmit a notification from the mobile device 110, the notification being indicative of a loss (or degradation below a threshold) of connection between the mobile device 110 and a cellular network of the mobile device 110. The portable electronic accessory 200 can be configured to activate the satellite modem 208 in response to receiving the notification. Accordingly, the portable electronic accessory 200 changes from a first power mode to a second power mode. The first power mode can be a low power mode, where one or more elements of the accessory 200 (e.g., the satellite modem 208) draw less power from the power source 206 as compared to that in the second power mode. In the second power mode, the satellite modem 208 can be "woken up" such that the satellite modem 208 and associated circuitry (e.g., one or more antenna elements and/or the wireless communication module 214) are actively receiving or transmitting radio signals to and from the satellite, or receiving or transmitting packets of data to and from the mobile device 110.

During an operation in the second power mode, the satellite modem 208, via the multiple antenna elements 204, transmits a first radio signal directed to the satellite. The satellite modem 208 is further configured to receive a second radio signal from the satellite 102 in response to transmitting the first radio signal via the multiple antenna elements 204. The satellite modem 208 is further configured to convert the second radio signal into a bit stream that is decodable by the mobile device 110. The bit stream is then transmitted from the portable electronic accessory 200 to the mobile device 110 through the wireless communication module 214.

Optionally, the portable electronic accessory 200 includes one or more processors 212. The one or more processors 212 can be coupled to the satellite modem 208 such that the one or more processors 212 control the operations of the modem. In some implementations, the one or more processors 212 can be configured to implement a beamforming process based on signals received from the one or more antenna elements 204. When installed in the portable electronic accessory 200, the power source 206 provides power to the one or more processors 212.

Figure 3:
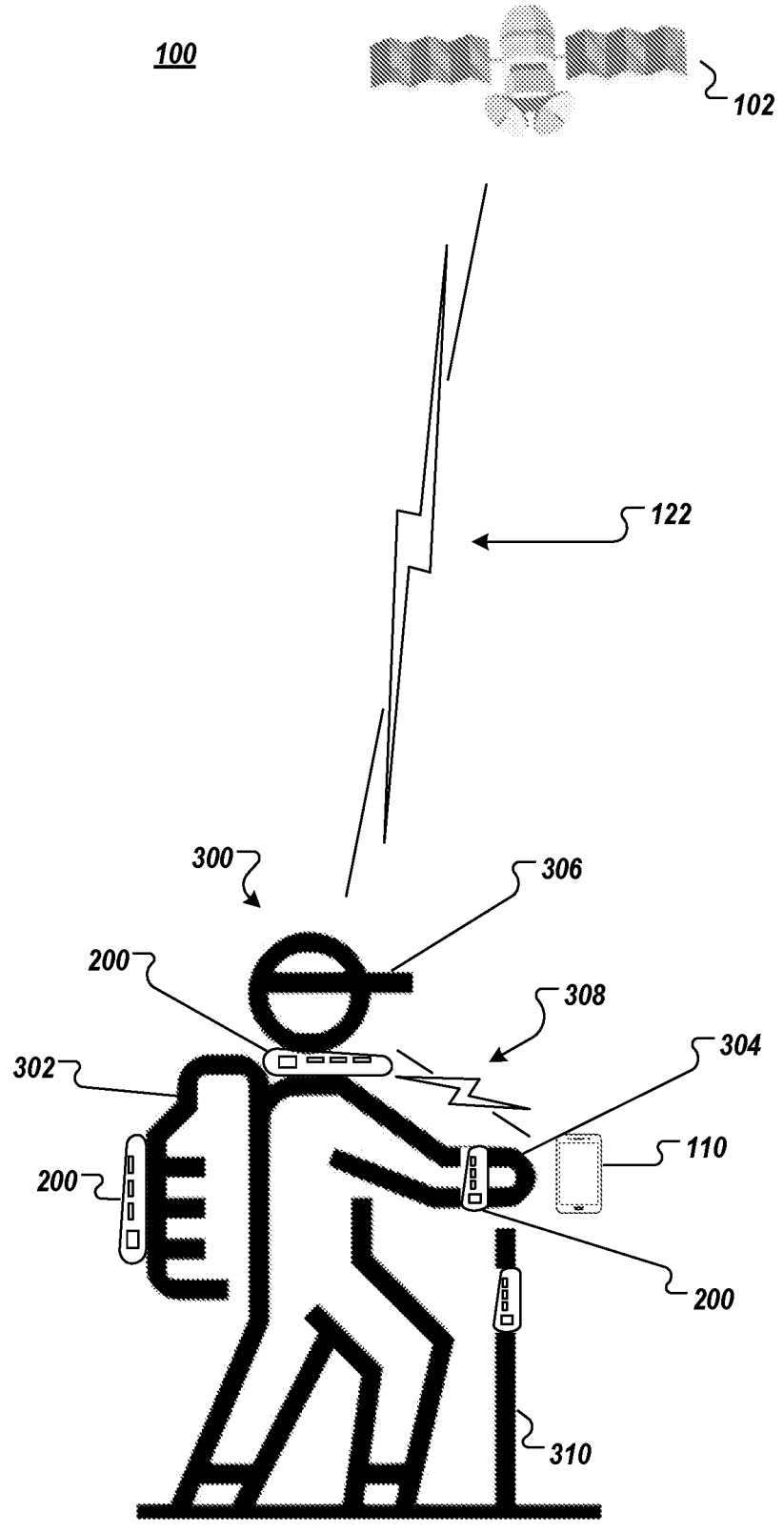
FIG. 3 illustrates portable electronic accessory as worn or utilized by a user.

In some implementations, the antenna elements 204 are optimized for sending signals directly to the satellite 102, as illustrated in FIG. 3. In one example, the antenna elements 204 are an array of antennas that is configured to direction-ally transmit radio signals in a specific direction. In one implementation, the antenna elements 204 are part of a smart antennas system that can be configured to implement a beamforming process by weighing the magnitude and phase of each of the antennas in the array. In some implementations, beamforming/beam-steering processes can be implemented using the signals obtained by the antenna elements 204, either by one or more processors 212 disposed on the portable electronic accessory 200, or one or more processors of a connected mobile device. In some implementations, the beamforming process can be implemented at a remote computing device (e.g., a server) that is at a remote location with respect to the mobile device connected to the portable electronic accessory 200.

The antenna elements 204 can include a first set of antennas dedicated to a first frequency band and a second set of antennas dedicated to a second frequency band. The first and second frequency bands are different and each of the first and second frequency bands can pertain to communications with respective satellites. A given antenna array may be configured/optimized based on various parameters, for example, a type of satellite, communication parameters associated with a satellite, and/or a particular geographical region. As an example, each of the first and second frequency bands can have a frequency band between about 1 GHz and about 50 GHz, such as between about 1 GHz and about 40 GHz. The antenna elements 204 are disposed within the body 202 in a manner than optimizes a line-of-sight between the antenna elements 204 and a position at which the satellite 102 is expected to be located.

In some examples, the antenna elements 204 may be configured differently depending on location in which the portable electronic accessory 200 is to be used. For example, the portable electronic accessory 200 that is used in the Pacific Northwest of the United States may have differently configured antenna elements 204 as compared to a portable electronic accessory 200 that is expected to be utilized along the Appalachian Trail. In some implementations, the antenna elements 204 can be different depending on the region in which the portable electronic accessory 200 is utilized. In some implementations, the antenna elements 204 (or a configuration of the antenna elements 204) are selected according to the type of satellite servicing a particular area.

The portable accessory 200 can be implemented in various form factors. As shown, in some implementations, the body 202 of the portable electronic accessory 200 has a U-shape and is configured as a neck-band. However, the configuration of the body 202 is not limited to the illustration shown in FIG. 2, and other form factors are within the scope of this disclosure. For example, the portable accessory configured to be attached to a backpack or other accessories.

In some implementations, the portable electronic accessory can be configured to be attached to a staff or stick used by hikers. In some implementations, the portable electronic accessory can be configured to be attached to a bike, or to a headgear (e.g., cap, helmet etc.) of a user. In preferred embodiments, the portable accessory 200 is configured such that in a worn or attached state, the surface of the accessory on which the antenna elements are disposed are facing skywards thereby increasing the chances of having a line-of-sight communication with a satellite. In some implementations, the form factor and/or attachment location of the portable electronic accessory are configured such that losses due to proximity of body parts and other accessories are low.

FIG. 3 illustrates some potential forma factors and locations for the portable electronic accessory 200. In the example of FIG. 3, a user 300 is wearing a backpack 302 head gear 306, and is holding a staff 310. The portable electronic accessory 200 is illustrated as being worn around the neck of the user 300, worn around a wrist 304 of the user 300, and disposed on the backpack 302 of the user 300. While all these locations/for factors are shown in a single figure, only one of the locations/form factors may be used by a user at one time. In some cases, multiple locations/form factors may be used, for example, for redundancy and additional safety (e.g., as backup in case of failure of one device).

FIG. 4 is a flow chart of an exemplary method 400 of operating the portable electronic accessory 200 shown in FIGS. 2-3. For convenience, the method 400 will be described as being performed by a system programmed appropriately in accordance with this specification. For example, the satellite modem 208 and/or processor 212 of FIG. 2, and the smart phone of FIG. 1 appropriately programmed, can perform the method 400.

The method 400 beings at operation 402 where a modem in the portable electronic accessory receives a notification or ping from a user device.

At operation 402, a notification indicative of a loss of connection between the mobile device and a cellular network is received at a wireless communication module of a device connected to a mobile device over a wireless connection.

At operation 404, the method proceeds by activating a satellite modem of the device in response to receiving the notification. Multiple antenna elements coupled to the modem are accessed by the mobile device. In some implementations, the antenna elements can be active devices that are powered by a power supply/battery, and may be activated upon receipt of the notification. As noted above, the antenna elements are disposed in the device such that a radiating surface of each of the antenna elements is disposed on an external face of the device. The satellite modem receives power from the battery. The satellite modem can be in a "sleep mode" where it receives power from the battery in a first power mode if the notification has not been received from the user device. In one example, the notification alerts the satellite modem that the user device is attempting to establish a short-range wireless communication. The first power mode, in at least one example, is a low power mode enabling the battery to conserve power when the portable electronic accessory has not established or is not attempting to establish a communications link between the satellite and the user device. The sleep mode saves power (e.g., the battery life) stored in the power source 206 when the mobile device 110 has sufficient cellular coverage to enable communication over the cellular network.

For example, the mobile device 110 sends a notification to the satellite modem 208, which is in low power "sleep mode." The notification alerts the satellite modem 208 that the mobile device 110 is attempting to establish a Bluetooth® or Wi-Fi connection between the mobile device 110 and the satellite modem 208. The first power mode is not sufficient to establish a communication link, but is sufficient to establish short-range wireless communication. In one example, the notification is received by the portable electronic accessory 200 when the mobile device 110 loses connection to a cellular network, or the quality of the connection drops below a threshold that would enable communication over the cellular network.

At operation 406, a first radio signal directed to a satellite is transmitted by the satellite modem via the multiple antenna elements. In some implementations, this can include a scan signal that is transmitted to search for satellites within a range of the satellite modem. For example, multiple scan signals, each configured in accordance with a corresponding frequency band of a particular satellite can be transmitted.

At operation 408, the method proceeds by receiving, at the satellite modem via the multiple antenna elements, a second radio signal from the satellite in response to transmitting the first radio signal. In some implementations, the second signal can include the identification of a satellite that is in receipt of one of the first signals transmitted by the satellite modem. In some implementations, a corresponding frequency band is selected for subsequent signals transmitted by the satellite modem. In some implementations, the multiple antenna elements include a first set of antenna elements dedicated to a first frequency band and a second set of antenna elements dedicated to a second frequency band different from the first frequency band, and one of the first set of antenna elements or the second set of antenna elements is selected in accordance with a satellite detected within a range of the satellite modem. For example, while the initial set of first signals are sent using both the first set of antenna elements and the second set of antenna elements using the corresponding frequency bands, upon receiving an identification of the satellite within range of the satellite modem, only one of the sets of antenna elements can be selected for the subsequent communications with the satellite.

The method 400 proceeds to operation 410 by converting, by the satellite modem, the second radio signal into a bit stream decodable by the mobile device.

At operation 412, the bit stream is transmitted to the mobile device through the wireless communication module. The bit stream is received at the device. The bit stream originates from the satellite. For example, the direct signals 122 are received at the portable electronic accessory 200, enabling a communication link between the mobile device 110 and the satellite 102 through the portable electronic accessory 200.

The portable electronic accessory 200 has a thin satellite modem 208 configured for satellite communication. The antenna elements 204 are optimized for particular satellite frequency band(s), thus optimizing the performance of communication over the satellite 102. The antenna elements 204 are located at the positons enabling a line-of-sight between antenna elements 204 and the satellite 102. In addition, an antenna pattern or directivity of antenna elements 204 is shaped or directed such that a line-of-sight is established with the satellite 102.

Embodiments of the subject matter and the actions and operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, e.g., one or more modules of computer program instructions, encoded on a computer program carrier, for execution by, or to control the operation of, data processing apparatus. The carrier may be a tangible non-transitory computer storage medium. Alternatively or in addition, the carrier may be an artificially-generated propagated signal, e.g., a machine-generated electrical, optical, or electromagnetic signal that is generated to encode information for transmission to suitable receiver apparatus for execution by a data processing apparatus. The computer storage medium can be or be part of a machine-readable storage device, a machine-readable storage substrate, a random or serial access memory device, or a combination of one or more of them. A computer storage medium is not a propagated signal.

The term "data processing apparatus" encompasses all kinds of apparatus, devices, and machines for processing data, including by way of example a programmable processor, a computer, or multiple processors or computers. Data processing apparatus can include special-purpose logic circuitry, e.g., an FPGA (field programmable gate array), an ASIC (application-specific integrated circuit), or a GPU (graphics processing unit). The apparatus can also include, in addition to hardware, code that creates an execution environment for computer programs, e.g., code that constitutes processor firmware, a protocol stack, a database management system, an operating system, or a combination of one or more of them.

A computer program can be written in any form of programming language, including compiled or interpreted languages, or declarative or procedural languages; and it can be deployed on a system of one or more computers in any form, including as a stand-alone program, e.g., as an app, or as a module, component, engine, subroutine, or other unit suitable for executing in a computing environment, which environment may include one or more computers interconnected by a data communication network in one or more locations.

A computer program may, but need not, correspond to a file in a file system. A computer program can be stored in a portion of a file that holds other programs or data, e.g., one or more scripts stored in a markup language document, in a single file dedicated to the program in question, or in multiple coordinated files, e.g., files that store one or more modules, sub-programs, or portions of code.

The processes and logic flows described in this specification can be performed by one or more computers executing one or more computer programs to perform operations by operating on input data and generating output. The processes and logic flows can also be performed by special-purpose logic circuitry, e.g., an FPGA, an ASIC, or a GPU, or by a combination of special-purpose logic circuitry and one or more programmed computers.

Computers suitable for the execution of a computer program can be based on general or special-purpose microprocessors or both, or any other kind of central processing unit. Generally, a central processing unit will receive instructions and data from a read-only memory or a random access memory or both. The essential elements of a computer are a central processing unit for executing instructions and one or more memory devices for storing instructions and data. The central processing unit and the memory can be supplemented by, or incorporated in, special-purpose logic circuitry.

Generally, a computer will also include, or be operatively coupled to, one or more mass storage devices, and be configured to receive data from or transfer data to the mass storage devices. The mass storage devices can be, for example, magnetic, magneto-optical, or optical disks, or solid state drives. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

To provide for interaction with a user, embodiments of the subject matter described in this specification can be implemented on one or more computers having, or configured to communicate with, a display device, e.g., a LCD (liquid crystal display) or organic light-emitting diode (OLED) monitor, a virtual-reality (VR) or augmented-reality (AR) display, for displaying information to the user, and an input device by which the user can provide input to the computer, e.g., a keyboard and a pointing device, e.g., a mouse, a trackball or touchpad. Other kinds of devices can be used to provide for interaction with a user as well; for example, feedback and responses provided to the user can be any form of sensory feedback, e.g., visual, auditory, speech or tactile; and input from the user can be received in any form, including acoustic, speech, or tactile input, including touch motion or gestures, or kinetic motion or gestures or orientation motion or gestures. In addition, a computer can interact with a user by sending documents to and receiving documents from a device that is used by the user; for example, by sending web pages to a web browser on a user's device in response to requests received from the web browser, or by interacting with an app running on a user device, e.g., a smartphone or electronic tablet. Also, a computer can interact with a user by sending text messages or other forms of message to a personal device, e.g., a smartphone that is running a messaging application, and receiving responsive messages from the user in return.

This specification uses the term "configured to" in connection with systems, apparatus, and computer program components. That a system of one or more computers is configured to perform particular operations or actions means that the system has installed on it software, firmware, hardware, or a combination of them that in operation cause the system to perform the operations or actions. That one or more computer programs is configured to perform particular operations or actions means that the one or more programs include instructions that, when executed by data processing apparatus, cause the apparatus to perform the operations or actions. That special-purpose logic circuitry is configured to perform particular operations or actions means that the circuitry has electronic logic that performs the operations or actions.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of what is being claimed, which is defined by the claims themselves, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claim may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. An electronic device, comprising:
a body; and
a housing covering the body that is configured to attach to a portion of a human body or another external apparatus, the housing having first openings in an external face of the housing, the housing configured to support:
a satellite modem configured to (i) convert digital data received from a mobile device into first radio signals for transmission to a satellite, and (ii) convert second radio signals received from the satellite into digital data for the mobile device, wherein the first radio signals and the second radio signals are within a corresponding frequency band associated with the satellite;
a wireless communication module having circuitry configured to:
support two-way communications with the mobile device, and
receive a notification from the mobile device indicating a connection quality between the mobile device and a cellular network of the mobile device;
a power source configured to;
provide operating power to the satellite modem and the wireless communication module, and
provide additional power for the satellite modem in response to the notification from the mobile device indicating the connection quality between the mobile device and the cellular network of the mobile device; and
multiple antenna elements coupled to the satellite modem, the multiple antenna elements configured to (i) radiate the first radio signals and (ii) receive the second radio signals from the satellite, the multiple antenna elements being disposed in the first openings of the housing such that a radiating surface of each of the antenna elements disposed within the first openings enables line-of sight communication with the satellite.

2. The electronic device of claim 1, wherein the body is configured to be worn on the body of a user of the electronic device.

3. The electronic device of claim 1, wherein the multiple antenna elements are a portion of a smart antenna array configured for directed beamforming towards the satellite.

4. The electronic device of claim 1, wherein the corresponding frequency band excludes frequencies used in terrestrial cellular networks.

5. The electronic device of claim 1, wherein the wireless communication module is a Bluetooth® or Wi-Fi module.

6. The electronic device of claim 1, wherein the antenna elements include a first set of antennas dedicated to a first frequency band and a second set of antennas dedicated to a second frequency band.

7. The electronic device of claim 6, wherein at least one of the first frequency band or second frequency band at least partially overlaps with the corresponding frequency band associated with the satellite.

8. The electronic device of claim 1, wherein the corresponding frequency band is between about 1 GHz and about 50 GHz.

9. The electronic device of claim 1, wherein the body is configured to be worn around the neck of a user of the electronic device.

10. The electronic device of claim 1, wherein another external apparatus comprises one of: a bag, a staff, a hiking gear, or a headgear.

11. The electronic device of claim 1, wherein the notification from the mobile device indicating the connection quality between the mobile device and the cellular network of the mobile device indicates at least one of: (i) a loss of communication between the mobile device and the cellular network or (ii) a communication quality falling below a predetermined threshold quality.

12. The electronic device of claim 1, wherein, in addition to the multiple antenna elements being disposed in the first openings of the housing, at least two or more of (i) the power source, (ii) the satellite modem, (iii) the wireless communication module, or (iv) one or more processors, are disposed in the first openings of the housing in the external face of the housing.

13. A method comprising:

providing, using a power source of an electronic device, a first power level to a satellite modem of the electronic device;

receiving, at a wireless communication module of the electronic device having first openings in an external face of the electronic device and connected to a mobile device over a wireless connection, a notification that indicates a connection quality between the mobile device and a cellular network of the mobile device;

in response to receiving the notification from the mobile device indicating the connection quality between the mobile device and the cellular network of the mobile device, providing, from the power source, additional power for the satellite modem;

accessing multiple antenna elements disposed in the first openings of the electronic device and coupled to the satellite modem, the antenna elements being disposed in the electronic device such that a radiating surface of each of the antenna elements disposed within the first openings enables line-of sight communication with a satellite;

transmitting, by the satellite modem via the multiple antenna elements, a first radio signal directed to a satellite;

receiving, at the satellite modem via the multiple antenna elements, a second radio signal from the satellite in response to transmitting the first radio signal;

converting, by the satellite modem, the second radio signal into a bit stream decodable by the mobile device; and transmitting the bit stream to the mobile device through the wireless communication module.

14. The method of claim 13, further comprising:

activating the multiple antenna elements coupled to the satellite modem.

15. The method of claim 13, further comprising, upon providing the additional power for the satellite modem, initiating a scan for satellites within a range of the satellite modem.

16. The method of claim 13, wherein the electronic device is configured to be worn on the body of a user.

17. The method of claim 13, further comprising executing a beamforming process to focus a signal of the multiple antenna elements towards the satellite.

18. The method of claim 13, further comprising selecting a frequency band for the first radio signal, wherein the frequency band is selected in accordance with a satellite detected within a range of the satellite modem.

19. The method of claim 13, wherein the multiple antenna elements include a first set of antenna elements dedicated to a first frequency band and a second set of antenna elements dedicated to a second frequency band different from the first frequency band, and one of the first set of antenna elements or the second set of antenna elements is selected in accordance with a satellite detected within a range of the satellite modem.

20. The method of claim 13, wherein the wireless communication module is a Bluetooth® or Wi-Fi module.

* * * * *